United States Patent [19]

Angeli

[11] Patent Number: 5,282,492
[45] Date of Patent: Feb. 1, 1994

[54] DUAL VALVE PLATE TWO-WAY PRESSURE RELIEF VALVE

[75] Inventor: Robert J. Angeli, Portsmouth, R.I.

[73] Assignee: The United States of America as represented by the Secretary of the Navy, Washington, D.C.

[21] Appl. No.: 23,426

[22] Filed: Feb. 23, 1993

[51] Int. Cl.$^5$ .......................................... F16K 17/196
[52] U.S. Cl. ................................................ 137/493.4
[58] Field of Search ............... 137/493.3, 493.4, 493.5, 137/493.6

[56] References Cited

U.S. PATENT DOCUMENTS

| | | | |
|---|---|---|---|
| 2,016,278 | 10/1935 | Ehlers | 137/493.4 X |
| 4,079,855 | 3/1978 | Avrea | 137/493.4 X |
| 4,153,073 | 5/1979 | Deters | 137/493.4 |
| 4,561,559 | 12/1985 | Rutan | 137/493.5 X |
| 4,691,734 | 9/1987 | Fort | 137/493.4 |

*Primary Examiner*—Robert G. Nilson
*Attorney, Agent, or Firm*—Michael J. McGowan; Prithvi C. Lall; Michael F. Oglo

[57] ABSTRACT

There is disclosed a two-way valve which includes dual valve plates to be positioned between first and second chambers having varying pressure therein, to relieve excess pressure in either chamber by permitting fluid flow from one chamber to the other. The valve includes a body portion having disposed therein dual valve plates. In the equilibrium state, the first valve plate is spring biased against the valve body in the direction of the first chamber to seal off any flow through the valve. The second valve plate is separately spring biased against the first valve plate in the direction of the second chamber, sealing off flow between the valve plates. When the pressure of the first chamber is greater than the pressure of the second chamber by a predetermined amount, the first and second valve plates move away from the valve body permitting fluid flow from the first chamber to the second chamber. When the pressure of the second chamber exerted on the second valve plate through apertures in the first valve plate is greater than the pressure of the first chamber by a predetermined amount, the second valve plate moves away from the face of the first valve plate permitting fluid flow from the second chamber to the first chamber.

17 Claims, 2 Drawing Sheets

DUAL VALVE PLATE TWO-WAY PRESSURE RELIEF VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The invention relates to relief valves and more particularly to a two-way relief valve, positioned between first and second chambers having varying pressure therein, in order to relieve excess pressure in the first chamber and permit the pressurized medium to exit the first chamber and enter the second chamber, and vice-versa, through a common passageway.

(2) Description of the Prior Art

Pressure relief valves are used to substantially equalize pressure between a chamber and the atmosphere or between two chambers. Typically, the two chambers are adapted to contain dissimilar fluids, such as fuel and air. Such chambers may be disposed in a device for operating in an underwater environment calling for adjacent storage of fluids under pressure. In an underwater environment, the device and chambers may be subject to high underwater pressures as well as high differential pressures. Under such pressures, fluid in one chamber may cause distortion and rupture of the chamber and permit the fluid to enter an adjacent chamber or to escape from the device itself, causing failure of the device. Expected pressure fluctuations within each chamber may also require distinct pressure relief set points for each chamber.

A pair of one way relief valves can function to provide separate relief settings for each chamber, but space available in the device may not permit the use of two valves.

The prior art two-way relief valves are of two types. The first, as illustrated by U.S. Pat. No. 4,773,444, provides one pressure relief set point for the two chambers through a single biasing means common to both chambers. Such valves normally react to total dynamic pressure of the two chambers and are not suited to sensing the differential static pressure between chambers and cannot provide separate pressure relief set points.

The second type, as illustrated by U.S. Pat. No. 4,317,467, consists of a single seat valve utilizing a flexible diaphragm between the two chambers. The diaphragm has a central opening, the edges of which seal against a ball element. Excess pressure on the diaphragm side of the valve forces the diaphragm to flex and move with the ball element in a direction away from the excess pressure until the diaphragm encounters stops. The ball element continues to move, away from the diaphragm, allowing flow through the central opening in the diaphragm. Excess pressure on the ball side of the valve forces the diaphragm to flex in a direction away from the excess pressure. The ball element and diaphragm move together until the ball element encounters a stop. The diaphragm continues to flex away from the ball element allowing flow through the diaphragm opening. While this valve can provide separate pressure relief set points for each chamber and senses differential static pressure, the flexible diaphragm is not suited for use in high pressure applications. The high pressure differentials possible in an underwater environment can cause distortion of the flexible diaphragm leading to leakage between the chambers under normal working conditions. Also the single valve seat arrangement of such devices restricts flow through a single opening in the diaphragm. Under the anticipated high pressures in an underwater environment, such flow restriction can lead to rupture of the diaphragm or of the chamber and device containing the chamber.

SUMMARY OF THE INVENTION

Accordingly, it is a general purpose and object of the present invention to provide two-way pressure relief between first and second chambers.

It is a further object of this invention to provide separate pressure relief set points for each of the chambers.

Another object is to provide for high differential working pressures between the chambers while not permitting leakage of fluids from one chamber to the other.

Still another object is to provide for high flow rates between the chambers when pressure relief settings have been exceeded.

These objects are accomplished in the present invention by disposing the valve in a bulkhead or conduit interconnecting first and second chambers having varying pressure therein. The valve is a dual valve plate two-way relief valve which permits fluid from either chamber to flow into the other chamber when pre-set pressures are approached on either side of the valve. The mixing of the two fluids ma render the device in which the chambers are disposed temporarily inoperative, but serves to avoid permanent damage to the device and chambers.

The rigidity of the valve components allows the inventive valve to maintain high pressure differentials between the chambers without fluid leakage caused by distortion of a flexible diaphragm valve seat.

The components are so arranged and constructed as to provide large flow passageways relative to flow passageways in flexible membrane valves, allowing less restricted fluid flow between the chambers than the prior art valves. Less restrictive flow results in quicker pressure relief, minimizing possible rupture of the chamber in the case of very fast pressure build-up.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
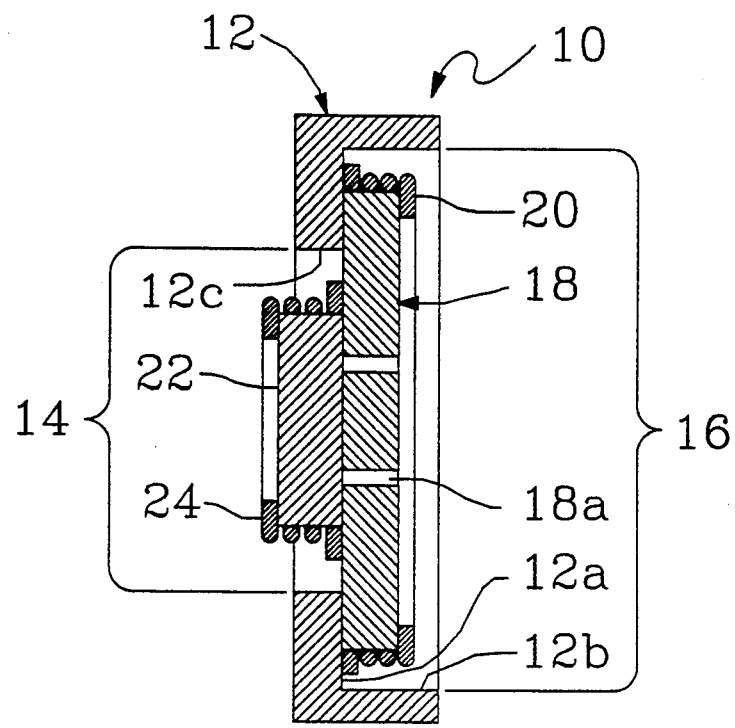
FIG. 1 is a cross-sectional view of a two-way pressure relief valve embodying the present invention.

Referring to FIG. 1, the two-way pressure relief valve 10 there illustrated in cross section, which embodies the present invention, includes a first body portion 12 having an annular surface 12a, a first cylindrical surface 12b and a second cylindrical surface 12c. Second cylindrical surface 12c defines a first port 14 and first cylindrical surface 12b defines a second port 16. Disposed within first body portion 12 is a first valve plate 18. A first biasing means 20 urges first valve plate 18 into sealing engagement with annular surface 12a, thus preventing fluid flow through first port 14. A second valve plate 22 is disposed within first body portion 12, adjacent to first valve plate 18 on the side of first valve plate 18 nearer to first port 14. Second valve plate 22 is in fluid communication with second port 16 through a plurality of evenly spaced apertures 18a in first valve plate 18. A second biasing means 24 urges first valve plate 18 and second valve plate 22 into sealing engagement, thus preventing fluid flow through apertures 18a.

When the force of the pressure at first port 14 exerted over the area of first port 14 exceeds the sum of the force of the pressure at second port 16 exerted over the area of first valve plate 18 plus the force exerted by first biasing means 20, flow through first port 14 to second port 16 is initiated. Excess pressure at port 14 causes first valve plate 18, together with second valve plate 22 and second biasing means 24, to move toward second port 16, against first biasing means 20 and away from annular surface 12a, allowing fluid flow through first port 14, between annular surface 12a and first valve plate 18, between cylindrical surface 12b and first valve plate 18, to second port 16.

When the force of the pressure at second port 16 exerted over the area of apertures 18a against second valve plate 22 exceeds the sum of the force of the pressure at first port 14 exerted over the area of second valve plate 22 plus the force exerted by second biasing means 24, flow through second port 16 to first port 14 is initiated. Excess pressure at second port 16 causes second valve plate 22 to move toward first port 14 against second biasing means 24 and away from first valve plate 18, allowing fluid flow through second port 16, through first valve plate apertures 18a, between first valve plate 18 and second valve plate 22, around second valve plate 22, to first port 14.

Figure 2:
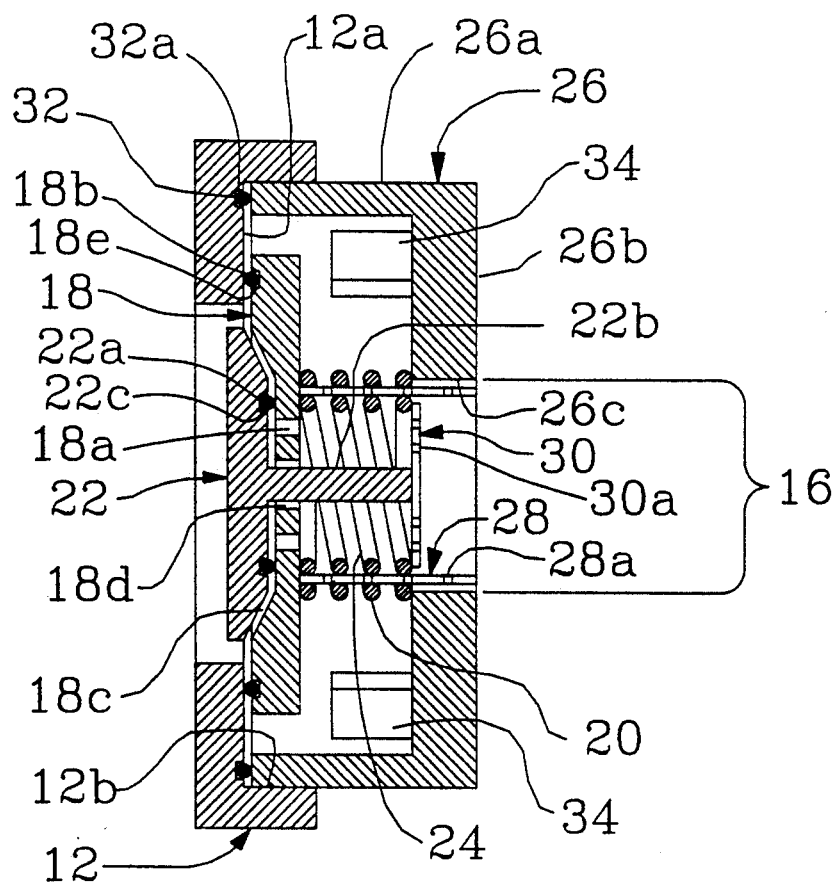
FIG. 2 is a cross-sectional view of the preferred embodiment of the present invention utilizing coil springs as biasing means and having guiding means for controlling valve plate movements.

FIG. 2 illustrates a cross section of the preferred embodiment of FIG. 1. First body portion 12 is interlocked with a second body portion 26. Second body portion 26 has a cylindrical portion 26a and an annular portion 26b. Cylindrical portion 26a and first cylindrical surface 12b of first body portion 12 are arranged to interfit together. Interlocking of first body portion 12 and second body portion 26 can be by any well known means, for example interlocking threads on cylindrical portion 26a and first cylindrical surface 12b, press fitting, or bolting through opposed flanges attached to first body portion 12 and second body portion 26. Interlocking of cylindrical portion 26a and first cylindrical surface 12b compresses O-ring seal 32, disposed within circular groove 32a in annular surface 12a, against cylindrical portion 26a, preventing fluid flow between the interfitting surfaces of first body portion 12 and second body portion 26. The placement of second body portion 26 within second port 16 restricts second port 16 opening to third cylindrical surface 26c of second body portion 26.

A tube 28 with multiple apertures 28a is disposed within body portion 26 and is affixed perpendicularly to first valve plate 18, in the direction of second port 16, extending therethrough. First biasing means 20 comprises a coil spring disposed around tube 28 and bearing against first valve plate 18 and annular portion 26b, compressing first valve plate O-ring seal 18b, disposed within circular groove 18e in first valve plate 18, between annular surface 12a and first valve plate 18. First valve plate 18 is provided with a recess 18c and a central opening 18d. Second valve plate 22 is disposed in recess 18c. Second valve plate O-ring seal 22a is disposed within circular groove 22c in second valve plate 22, encompassing first valve plate apertures 18a. Second valve plate 22 has a stem 22b extending therefrom, through opening 18d in first valve plate 18, internally of tube 28, in the direction of second port 16. To the end of stem 22b remote from second valve plate 22 and internal to tube 28, there is fixed a disc 30 with multiple apertures 30a. Second biasing means 24 comprises a coil spring disposed within tube 28 and bearing against first valve plate 18 and disc 30, compressing second valve plate O-ring seal 22a between first valve plate 18 and second valve plate 22. Three or more rectangular prismatic stop members 34 are evenly spaced around the interior of cylindrical portion 26a, extending from annular portion 26b in the direction of first valve plate 18 for a distance less than the distance between first valve plate 18 and annular portion 26b.

Figure 3:
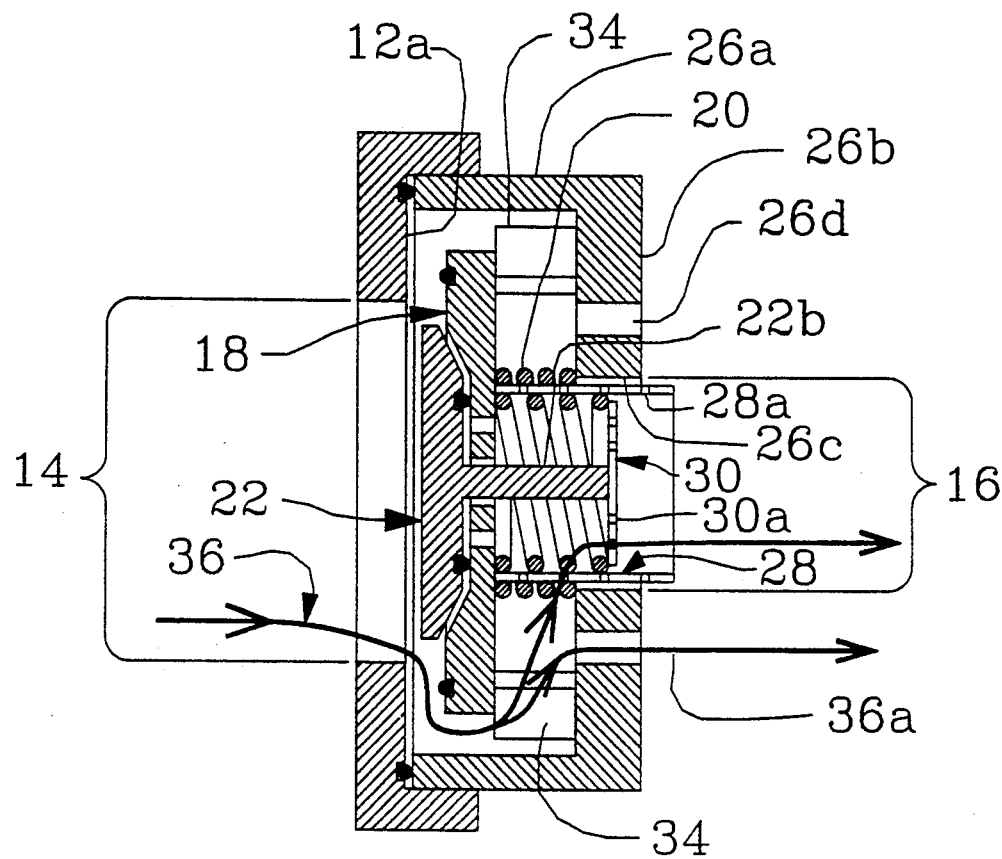
FIG. 3 is a cross-sectional view of the valve of FIG. 2 illustrating its operation during a first mode of operation.

FIG. 3 illustrates the mode of operation of the preferred embodiment when excessive pressure builds up at first port 14. First valve plate 18 and second valve plate 22, together with tube 28, stem 22b and disc 30, move toward second port 16, against the bias of first coil spring 20 and away from annular surface 12a, until first valve plate 18 abuts multiple stop members 34. Movement of tube 28 is guided by third cylindrical surface 26c. Fluid flows, as indicated by arrows 36, through first port 14, between first valve plate 18 and annular surface 12a, between first valve plate 18 and cylindrical portion 26a, in the volume between adjacent stop members 34, through apertures 28a of tube 28, through apertures 30a of disc 30, to second port 16. Additional fluid flow, as indicated by arrows 36a, is accommodated through flow apertures 26d in annular portion 26b.

Figure 4:
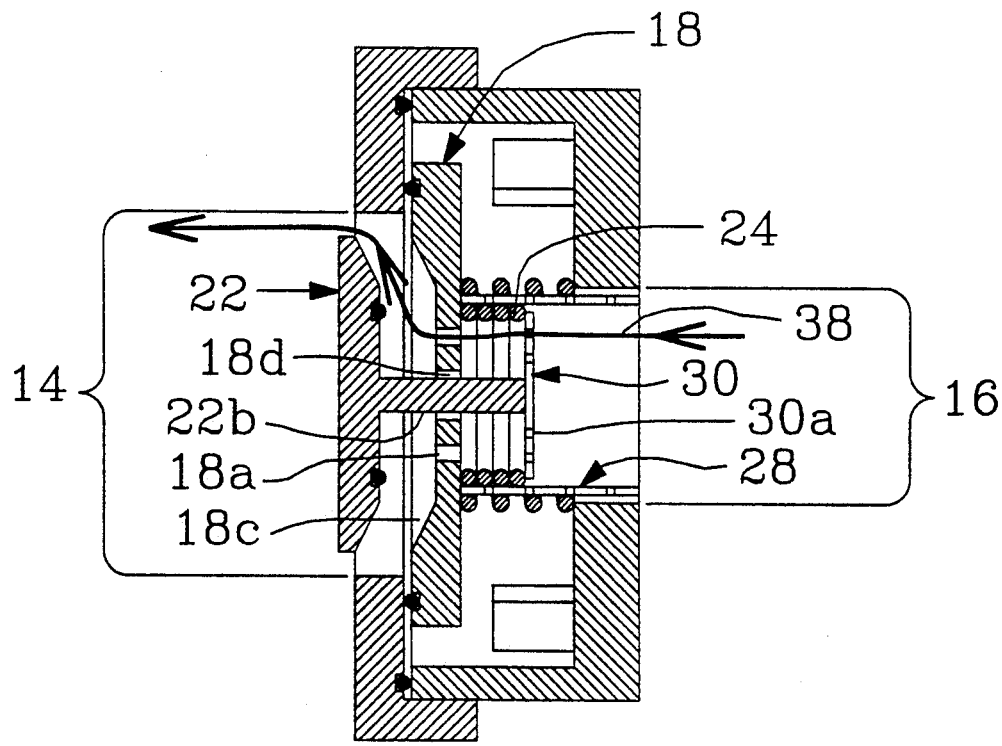
FIG. 4 is a cross-sectional view of the valve of FIG. 2 illustrating its operation during a second mode of operation.

FIG. 4 illustrates the mode of operation of the preferred embodiment when excessive pressure builds up at second port 16. Fluid passes through apertures 30a of disc 30, through apertures 18a in first valve plate 18 to bear against second valve plate 22, to move second valve plate 22 toward first port opening 14, against the bias of second coil spring 24, away from first valve plate 18, with stem 22b and disc 30 moving slidably within tube 28 until second coil spring 24 is fully compressed. Movement of second valve plate 22, together with stem 22b and disc 30, is guided by disc 30 moving slidably within tube 28, and by stem 22b moving slidably through opening 18d. Fluid flows, as indicated by arrows 38, through second port 16, through apertures 30a in disc 30, within compressed second coil spring 24, through apertures 18a in first valve plate 18, between depression 18c and second valve plate 22, around second valve plate 22, to first port 14. Depression 18c serves to direct flow smoothly around second valve plate 22 while directing flow pressure centrally against second valve plate 22, further maintaining alignment of stem 22b and disc 30 within tube 28.

What has thus been described is a valve which permits excess pressure at either port to be relieved to the other port by allowing fluid flow through the valve. Two biasing means, coil spring 20 for first valve plate 18 and coil spring 24 for second valve plate 22, provide for separate relief pressure set points at each of the ports. The rigidity of first valve plate 18 and second valve plate 22 make the valve suitable for applications where high differential pressures may exist between the ports. The length of travel of the valve plates as well as the full circumferential flow around the valve plates provide for high flow capacities and lessen the risk of pressure building up beyond the relief set points due to restricted flow.

Obviously many modifications and variations of the present invention may become apparent in light of the above teachings. For example: body portions 12 and 26 may be fabricated such that ports 14 and 16 include hose or pipe connections. Such a configuration could limit the size or number of penetrations into the pressurized chambers and would also not expose the external surfaces of the valve to the fluids contained within the pressurized chambers. Alternatively, body portions 12 and 26 may incorporate any well known attachment means and sealing means for affixing the valve to the bulkhead separating the pressurized chambers. Similarly, body portion 26 may include flange projections for attachment directly to the bulkhead, or the bulkhead itself may serve the function of body portion 12 with first valve plate 18 bearing directly against the bulkhead. Additionally, interlocking of body portion 12 and body portion 26 may be accomplished in a number of ways. For example, body portions 12 and 26 may be fabricated with mating threads, or interlocking may be by means of fasteners inserted through flange projections on body portions 12 and 26.

In light of the above, it is therefore understood that within the scope of the appended claims, the invention may be practiced otherwise than as specifically described.

What is claimed is:

1. A two-way relief valve comprising:
   a first body portion having a first annular portion and a first cylindrical portion, said first annular portion having an annular surface, said annular surface having a first central circular opening, said first central circular opening having a first inner cylindrical surface defining a first port, said first cylindrical portion having a second inner cylindrical surface defining a second port;
   a first valve plate disposed in said body portion, said first valve plate abutting said annular surface, said first valve plate further comprising flow apertures so disposed as to be in alignment with said first port;
   a second valve plate disposed within said body portion, adjacent to said first valve plate surface nearest to said first port, said second valve plate extending over said first valve plate flow apertures;
   a first biasing means urging said first valve plate and said annular surface of said body portion into sealing engagement, said first valve plate being moveable away from said annular surface, away from said first port, against said first biasing means, responsive to a fluid pressure at said first port which is greater than the fluid pressure at said second port by a predetermined amount for establishing a first fluid flow path from said first port, around said first valve plate, through said body portion, and to said second port;
   a second biasing means urging said second valve plate and said first valve plate into sealing engagement, said second valve plate being moveable away from said first valve plate, toward said first port, against said second biasing means, responsive to a fluid pressure at said second port which is greater than the fluid pressure at the said first port by a predetermined amount for establishing a second fluid flow path from said second port, through said body portion, through said first valve plate flow apertures, around said second valve plate, and to said first port; and,
   a second body portion interlocking with said first body portion, said second body portion comprising a second annular portion, said second annular portion having a second central circular opening, said second circular opening having a third inner cylindrical surface, said second annular portion further comprising flow apertures disposed radially outward of said second circular opening, said second annular portion flow apertures accommodating a portion of said first fluid flow and a portion of said second fluid flow, said second body portion further comprising a second cylindrical portion interfitting with said second cylindrical surface of said first body portion, said second cylindrical portion being disposed within said second port, said second port being restricted to said third inner cylindrical surface of said second body portion, said second cylindrical portion further comprising stop means for limiting the movement of said first valve plate towards said second port.

2. A valve according to claim 1, wherein said annular surface of said first body portion comprises a circular groove, said groove having a first O-ring contained therein, said first O-ring being compressed between said annular surface of said first body portion and said cylindrical portion of said second body portion by said interlocking of said first body portion and said second body portion, said first O-ring compression maintaining a sealing engagement between said first body portion and said second body portion.

3. A valve according to claim 2 further comprising a cylindrical tube fixedly attached perpendicularly to said first valve plate, said tube extending from said first valve plate through said second port, said tube having a diameter slightly less than said third inner cylindrical surface, said third inner cylindrical surface serving as a guiding means for the movement of said tube and said first valve plate, said tube having multiple apertures for passage of said first fluid flow.

4. A valve according to claim 3 wherein said first biasing means comprises a first coil spring surrounding said tube, said first coil spring extending between and bearing against said first valve plate and said second annular portion.

5. A valve according to claim 3 wherein:
   said first valve plate further comprises a central opening; and
   said second valve plate further comprises a stem, said stem extending through said first valve plate central opening into the interior of said tube, said stem having affixed to the end remote from said second valve plate a disc, said disc having a diameter slightly smaller than said tube diameter, said tube serving as a guiding means for movement of said disc, said disc having multiple apertures for passage of said second fluid flow.

6. A valve according to claim 5 wherein said first biasing means comprises a first coil spring surrounding said tube, said first coil spring extending between and bearing against said first valve plate and said second annular portion.

7. A valve according to claim 5 wherein said second biasing means comprises a first coil spring within said tube, said first coil spring extending between and bearing against said first valve plate and said disc.

8. A valve according to claim 6 wherein said second biasing means comprises a second coil spring within said tube, said second coil spring extending between and bearing against said first valve plate and said disc.

9. A valve according to claim 4 wherein:
said first valve plate surface nearest to said first port comprises a truncated cone-shaped depression, said first valve plate flow apertures being contained within the smaller diameter of said depression; and
said second valve plate surface nearest to said first valve plate surface comprises a truncated cone interfitting with said first valve plate depression.

10. A valve according to claim 4 wherein:
said first valve plate surface nearest to said annular surface of said first body portion comprises a circular groove, said groove having a second O-ring contained therein, said second O-ring being compressed against said annular surface of said first body portion by the action of said first biasing means, said second O-ring compression maintaining said sealing engagement between said first valve plate and said annular surface of said first body portion; and
said second valve plate surface nearest to said first valve plate comprises a circular groove, said groove having a diameter completely encompassing said flow apertures in said first valve plate, said groove having a third O-ring contained therein, said third O-ring being compressed against said first valve plate by the action of said first biasing means, said third O-ring compression maintaining said sealing engagement between said first valve plate and said second valve plate.

11. A valve according to claim 10 wherein:
said first valve plate surface nearest to said first port comprises a truncated cone-shaped depression, said first valve plate flow apertures being contained within the smaller diameter of said depression; and
said second valve plate surface nearest to said first valve plate surface comprises a truncated cone interfitting with said first valve plate depression.

12. A valve according to claim 7 wherein:
said first valve plate surface nearest to said first port comprises a truncated cone-shaped depression, said first valve plate flow apertures being contained within the smaller diameter of said depression; and
said second valve plate surface nearest to said first valve plate surface comprises a truncated cone interfitting with said first valve plate depression.

13. A valve according to claim 7 wherein:
said first valve plate surface nearest to said annular surface of said first body portion comprises a circular groove, said groove having a second O-ring contained therein, said second O-ring being compressed against said annular surface of said first body portion by the action of said first biasing means, said second O-ring compression maintaining said sealing engagement between said first valve plate and said annular surface of said first body portion; and
said second valve plate surface nearest to said first valve plate comprises a circular groove, said groove having a diameter completely encompassing said flow apertures in said first valve plate, said groove having a third O-ring contained therein, said third O-ring being compressed against said first valve plate by the action of said first biasing means, said third O-ring compression maintaining said sealing engagement between said first valve plate and said second valve plate.

14. A valve according to claim 13 wherein:
said first valve plate surface nearest to said first port comprises a truncated cone-shaped depression, said first valve plate flow apertures being contained within the smaller diameter of said depression; and
said second valve plate surface nearest to said first valve plate surface comprises a truncated cone interfitting with said first valve plate depression.

15. A valve according to claim 8 wherein:
said first valve plate surface nearest to said first port comprises a truncated cone-shaped depression, said first valve plate flow apertures being contained within the smaller diameter of said depression; and
said second valve plate surface nearest to said first valve plate surface comprises a truncated cone interfitting with said first valve plate depression.

16. A valve according to claim 8 wherein:
said first valve plate surface nearest to said annular surface of said first body portion comprises a circular groove, said groove having a second O-ring contained therein, said second O-ring being compressed against said annular surface of said first body portion by the action of said first biasing means, said second O-ring compression maintaining said sealing engagement between said first valve plate and said annular surface of said first body portion; and
said second valve plate surface nearest to said first valve plate comprises a circular groove, said groove having a diameter completely encompassing said flow apertures in said first valve plate, said groove having a third O-ring contained therein, said third O-ring being compressed against said first valve plate by the action of said first biasing means, said third O-ring compression maintaining said sealing engagement between said first valve plate and said second valve plate.

17. A valve according to claim 16 wherein:
said first valve plate surface nearest to said first port comprises a truncated cone-shaped depression, said first valve plate flow apertures being contained within the smaller diameter of said depression; and
said second vale plate surface nearest to said first valve plate surface comprises a truncated cone interfitting with said first valve plate depression.

* * * * *